(12) United States Patent
Yoshida et al.

(10) Patent No.: US 6,669,012 B1
(45) Date of Patent: Dec. 30, 2003

(54) CONVEYOR DEVICE

(75) Inventors: Takashi Yoshida, Chiba (JP); Yuichi Komazawa, Hokkaido (JP)

(73) Assignee: Technowave, Ltd., Tokyo (JP)

( * ) Notice: Subject to any disclaimer, the term of this patent is extended or adjusted under 35 U.S.C. 154(b) by 0 days.

(21) Appl. No.: 09/869,013

(22) PCT Filed: Dec. 20, 1999

(86) PCT No.: PCT/JP99/07157
§ 371 (c)(1),
(2), (4) Date: Jun. 22, 2001

(87) PCT Pub. No.: WO00/39008
PCT Pub. Date: Jul. 6, 2000

(30) Foreign Application Priority Data

Dec. 24, 1998 (JP) .......................................... H10-365916

(51) Int. Cl.⁷ .............................................. B65G 47/10
(52) U.S. Cl. .................................. 198/890; 198/370.06
(58) Field of Search ........................... 198/370.06, 456, 198/802, 890

(56) References Cited

U.S. PATENT DOCUMENTS

| | | | | |
|---|---|---|---|---|
| 4,915,209 A | * | 4/1990 | Canziani ............... | 198/370.006 |
| 4,938,335 A | * | 7/1990 | Canziani ................ | 198/370.06 |
| 6,123,647 A | * | 9/2000 | Mitchell ...................... | 198/456 |
| 6,209,703 B1 | * | 4/2001 | Soldavini ............... | 198/370.06 |

OTHER PUBLICATIONS

Toru, "Carrier Transporting Device", JP-A-05-286546 (Nov. 1993).
Hiroshi et al., "Sorting Equipment", JP-A-10-17137 (Jan. 1998).
Takuo et al., "Article Sorting Device", JP-A-06-127662 (May 1995).

* cited by examiner

Primary Examiner—Joseph E. Valenza
(74) Attorney, Agent, or Firm—Fitch, Even, Tabin & Flannery

(57) ABSTRACT

A conveyor device capable of moving a package also in a main direction orthogonal to a direction of conveyance, and thereby making it possible to change and maintain a package in any posture.

The conveyor device 30 of the present invention is formed by coupling a plurality of conveyor sub-units 1 in an endless manner while each sub-unit 1 by itself has a function as a belt conveyor and the drive direction of the belt of the conveyor sub-unit 1 is in a direction orthogonal to the main direction of conveyance of the conveyor device 30. Some or all of the conveyor sub-units 1 constituting the conveyor device 30 can be made to operate in cooperation with each other by combining the conveyor device 30 with a control instruction device.

The conveyor sub-unit 1 comprises a belt, a drive, means for the belt, a communication means for communicating with a control instruction device and other conveyor sub-units, a detecting means for detecting the position of a package on the belt, and control means for driving the belt forward or in reverse by using information from each of said means.

10 Claims, 10 Drawing Sheets

CONVEYOR DEVICE

This application is the National Phase of International Application PCT/JP99/07157, filed Dec. 20, 1999 which designated the U.S. and was not published under PCT Article in English.

TECHNICAL FIELD

The present invention relates to a conveyor device, and particularly to a conveyor device for controlling the posture and position of a package during conveyance process in the distribution of goods.

BACKGROUND ART

It is necessary to move packages in a direction orthogonal to the direction of advancement of the conveyor in order to control merging and divergence of packages in distributing goods.

Namely, when a case is considered where packages are merged or diverged, as shown in FIG. 11, for example, first, in order to merge packages flowing from three lines, it is necessary to move the packages closer to the center of the conveyor, and then, in order to diverge them in two directions, it is necessary to distribute the packages to the left and right to come in line with the positions of the conveyors that are the divergence destinations.

In case of goods distribution equipment of conventional methods, a member referred to as a "shoe" that operates along a rail located at a fixed angle with respect to the traveling direction of the package presses against the package so as to push and thereby to move the package in an orthogonal direction at the position at which it is wished to provide divergence.

FIG. 10 shows a method based on such shoes for the divergence to the left and right wherein each of a number of shoes 101 located on the rail 100 located at a fixed angle with respect to the direction of travel are generally retracted to a standby position, and is moved thereby pushing the package W in the direction of the sorting unit when a corresponding package W comes close to a corresponding sorting unit 102, so that the package W is ejected to the side of the sorting unit 102.

These conventional conveyance methods have the following problems.

(1) The diverging method employing shoes is a mechanical diverging method and it is therefore necessary to modify the conveyor device as a whole in order to change the layout. This requires a large amount of labor, time and money.

(2) It is necessary to have a distance of exactly one shoe between packages in order to move the shoes and thereby to push the packages.

(3) The shoe movement is determined by the rail and thus no operation is possible to take into consideration the width and posture of the package. The package moving down in a tilted condition cannot be aligned in a line and each package can only be pushed by the same number of shoes, regardless of whether the package is large or small, and thus, pushing of large packages becomes unstable.

(4) When a package is pushed by shoes, the positions of each package are aligned along a surface where it is pushed, but when the width of the each package is different, the alignment of the position of center cannot be achieved and the alignment of the package along a surface on an opposite side to the shoe cannot be achieved.

(5) The angle of the rail for pushing the shoes is mechanically fixed, and thus, there may be cases where a package may be kicked off depending on the condition such as the weight, size or speed of conveyance of the package. Consequently, it may be necessary to change the conveyor device as a whole in order to change the conveyance speed.

(6) When it is intended to perform at a high speed complex branching and merging controls as shown in FIG. 11, the number of types of the conveyor device to be used becomes many and the shape of conveyor device to be used becomes long. Consequently, the work of mounting becomes complex and requires a large amount of space.

(7) More than anything, it was not possible with the conventional device apparatus to mount a package at any position on a conveyor portion of the conveyor device or to change the posture of a package in any manner.

DISCLOSURE OF THE INVENTION

The object of the present invention is to provide a device which makes it possible to maintain a package in any posture, to change into any posture, and to move a package in a goods distribution system etc. The object is also to provide a device which enables the implementation of a goods distribution system of flexible type wherein it is possible to reduce the number of types of goods distribution equipment employed in the construction of a goods distribution system and also to eliminate the need to enlarge the device itself and thereby being flexible when a high speed is to be achieved.

In order to achieve the aforementioned object, the invention of claim 1 is directed to a conveyor device comprising a main conveyor portion formed by linking together a plurality of conveyor sub-units, and a driving means for driving the main conveyor portion, wherein each of the conveyor sub-units comprises a secondary conveyor portion, a drive means for secondary conveyor portion for driving the secondary conveyor portion forward and in reverse, and means for communicating with a control instruction device, and wherein a conveying direction of each of the secondary conveyor portion is orthogonal to a conveying direction of the main conveyor portion.

The conveyor sub-units constituting the main conveyor portion of the conveyor device each has a conveyor portion (the conveying portion of each conveyor sub-unit is hereinafter referred to as "a secondary conveyor portion"). In another words, each conveyor unit has by itself a function as a conveyor.

The conveyor direction of each secondary conveyor portion (secondary conveyor direction) is in a direction orthogonal to the conveyor direction of the main conveyor portion of the conveyor device (main conveyor direction).

The control instruction device is a control means for instructing the operation of the conveyor sub-units or the operation of the conveyor device comprising the conveyor sub-units and is a control device, such as a host computer, provided externally of the conveyor sub-units.

The communication means for communicating between the conveyor sub-units and the control instruction device may be cabled or wireless. The conveyor device is made capable of moving packages on the main conveyor portion in a direction orthogonal to the direction of travel of the main conveyor portion and of changing the posture of the package as a result of each conveyor sub-unit driving the secondary conveyor portion based on the instructions from the control instruction device.

The invention of claim 2 is directed to a conveyor device comprising a main conveyor portion formed by linking together a plurality of conveyor sub-units, and a drive means for driving the main conveyor portion, wherein each of the conveyor sub-unit comprises a secondary conveyor portion, a drive means for secondary conveyor portion for driving the secondary conveyor portion forward and in reverse, and a means for performing inter-units communication with other conveyor sub-units, wherein at least one of the conveyor sub-units comprises a means for communicating with a control instruction device, and wherein a conveying direction of each secondary conveyor portion is in a direction orthogonal to a conveying direction of the main conveyor portion.

Each conveyor unit has a means for mutually communicating with other sub-units (hereinafter referred to as "inter-sub-units communication means"), and thus, each conveyor unit becomes capable of operating based on the information from other conveyor units. As a result, packages on the main conveyor portion can be moved in a direction orthogonal to the direction of travel of the main conveyor portion and of changing the posture of a package by each conveyor sub-unit driving the secondary conveyor portion based on the instructions from the control instruction device.

It is by no means necessary for the means for communicating with the control instruction device and the inter-sub-unit communication means to be two separate means, and the same means maybe used for these means.

The invention of claim 3 is directed to the conveyor device of either claim 1 or 2, wherein some or all of the conveyor sub-units each comprises a detection means for detecting a position of a package on its own secondary conveyor portion.

Some or all of the conveyor sub-units may each be provided with a detection means for detecting the position of a package thereby making it possible to use the package position information as the information for moving the package for changing the posture of package.

The invention of claim 4 is directed to the conveyor device of any one of claims 1 through 3, wherein some or all of the conveyor sub-units each comprises a control means for the drive means for driving a secondary conveyor portion.

The conveyor sub-units have internal control means separate from the external control device thereby making it possible to operate in an intelligent manner.

The invention of claim 5 is directed to the conveyor device of any one of claims 1 through 4, wherein the conveyor sub-units are linked together in an endless manner.

It is a conveyor device wherein the main conveyor portion is arranged in an endless manner.

The invention of claim 6 is directed to a conveyor system comprising a control instruction device and the conveyor device of any one of claims 1 through 5, wherein the conveyor sub-units belonging to the portion where the package is mounted operate cooperatively when a package is mounted so as to straddle across a plurality of the conveyor sub-units constituting the main conveyor portion.

One of the features of this conveyor system resides in that it is operated so that the conveyor sub-units on which a package is mounted operate cooperatively when a package is mounted so as to straddle across a plurality of the conveyor sub-units. The package can be made to move in a direction orthogonal to the main conveyor direction or to cause the posture of the package to be changed by cooperatively and appropriately moving the secondary conveyor portion of the conveyor sub-units belonging to the portion on which the package is mounted by only an amount necessary for the implementation of the targeted position and posture.

The invention of claim 7 is directed to a conveyor system comprising a control instruction device and a conveyor device, wherein the conveyor device comprises a main conveyor portion formed by a plurality of conveyor sub-units being coupled and a drive means for the main conveyor portion, wherein the each conveyor sub-unit comprises a secondary conveyor portion, a drive means for driving the secondary conveyor portion forward and in reverse, a means for inter-units communication with other conveyor sub-units, a detection means for detecting a position of a package on its own secondary conveyor portion, and a control means for the drive means for the secondary conveyor portion, wherein at least one of the conveyor sub-units comprises a means for communicating with a control instruction device, wherein a conveying direction of the each secondary conveyor portion is in a direction orthogonal to a conveying direction of the main conveyor portion, and wherein when a package is mounted on the main conveyor portion, the conveyor sub-units belonging to a portion where the package is mounted cooperatively operate where each:

(1) recognizes the position of the package on its own secondary conveyor portion by using the detection means,
(2) calculates a required amount of movement for its own secondary conveyor portion from a relationship between a package position to be materialized and is given by an instruction from the control instruction device and a current package position, and
(3) moves its own secondary conveyor portion only by the required amount by using the drive means for the secondary conveyor portion.

Among the conveyor sub-units constituting the main conveyor portion, the conveyor units belonging to the portion on which a package is mounted form a single group, and receive the instructions from the control instruction device and thereby obtain the position information of the package mounted on itself, and each of the conveyor units exchanges with each other the package position information thereby calculating based on such information the amount of movement required for their own secondary conveyor portion to implement the instruction from the control instruction device, and then moving the secondary conveyor portion of their own by the necessary amount. As a result, each conveyor sub-unit drives its respective secondary conveyor portion and thereby making it possible to move the package on the main conveyor portion in a direction orthogonal to the direction of travel of the main conveyor portion or to change in any manner the posture of the package based on the instruction from the control instruction device when a package is mounted straddling across a plurality of conveyor sub-units.

The invention of claim 8 is directed to a conveyor sub-unit having a conveyor portion, comprising:
(1) a drive means for conveyor portion,
(2) a detecting means for detecting a position of a package on a conveyor portion,
(3) a communication means for communicating with a control instruction device, and
(4) a control means for controlling the drive means for conveyor portion.

The invention of claim 9 is directed to a conveyor sub-unit having a conveyor portion, comprising:
(1) a drive means for conveyor portion,
(2) a detecting means for detecting a position of a package on a conveyor portion, (3) a communication means for inter-units communication with other conveyor sub-units, and
(4) a control means for controlling the drive means for conveyor portion.

The invention of claim 10 is directed to a conveyor sub-unit having a conveyor portion, comprising:
(1) a drive means for conveyor portion,
(2) a detecting means for detecting a position of a package on a conveyor portion,
(3) a communication means for communicating with a control instruction device,
(4) a communication means for inter-units communication with other conveyor sub-units, and
(5) a control means for controlling the drive means for conveyor portion.

The inventions of claim 8 through 10 are directed to a conveyor sub-unit. When the conveyor device or the conveyor system of any of claim 1 through 7 is constructed, a plurality of units are coupled to constitute the main conveyor portion, with the conveyor portion of the respective conveyor sub-units constituting the secondary conveyor portion of the conveyor device. Further, a use of a plurality of the units in other mode is also possible.

BEST MODE FOR CARRYING OUT THE INVENTION

First, an embodiment of a conveyor sub-unit of the present invention is described.

Figure 1:
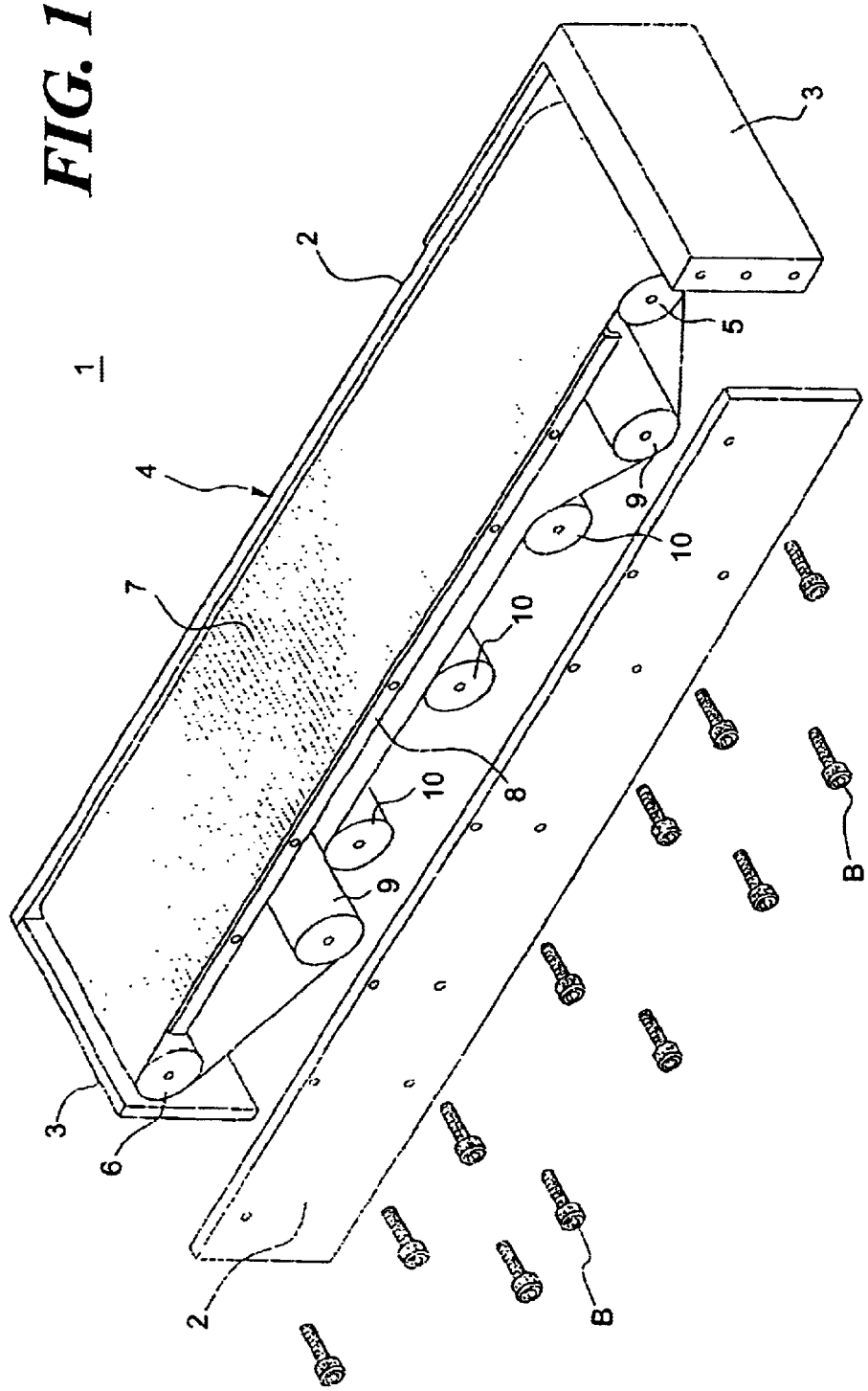
FIG. 1 is a perspective view showing an exploded side portion of a conveyor sub-unit of an embodiment of the present invention.
Figure 2:
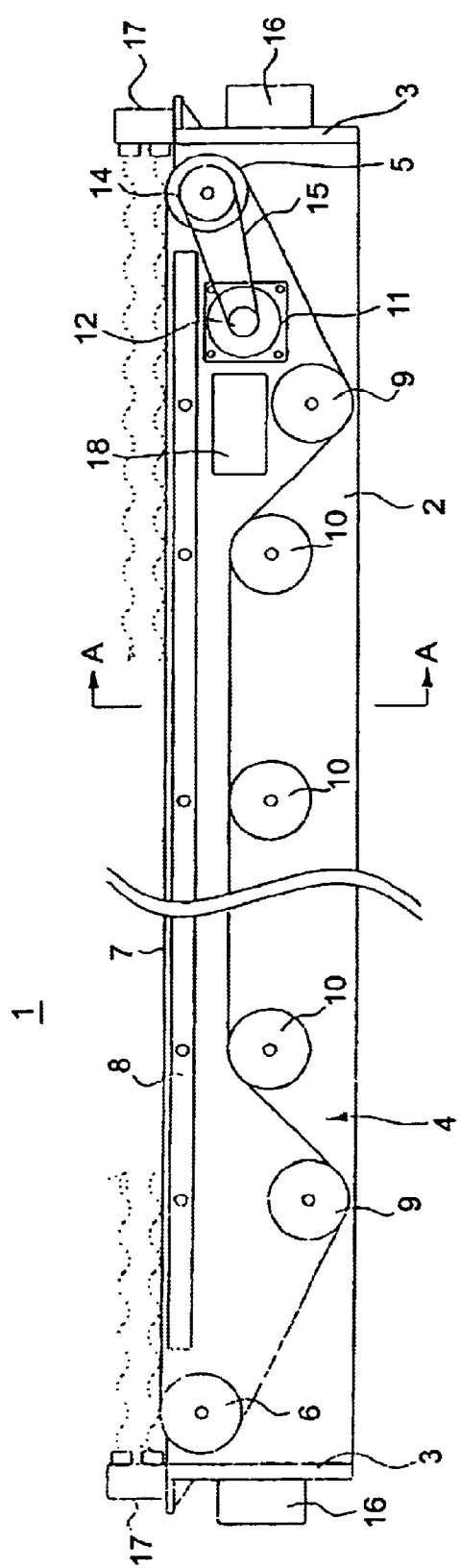
FIG. 2 is a side cross-section and a front cross-section taken along line A—A of the same conveyor sub-unit.
Figure 2A:
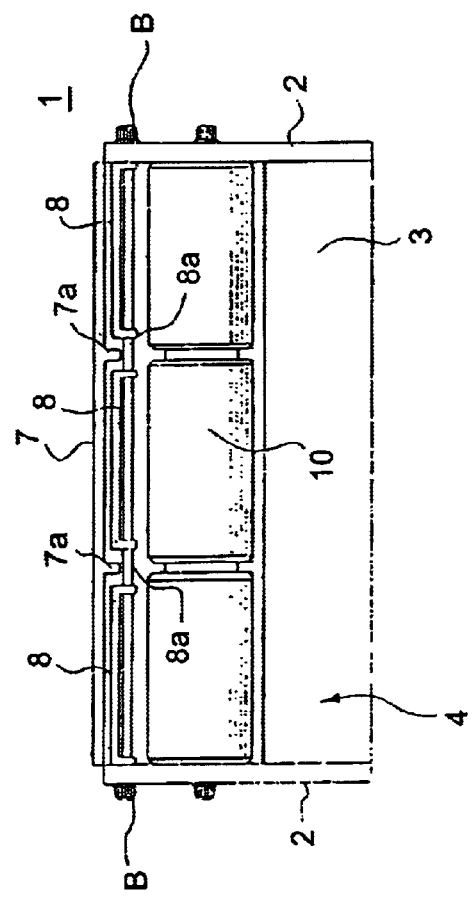

The conveyor sub-unit 1 as shown in FIGS. 1 and 2 comprises the following mechanism being provided inside of a rectangular-shaped casing framed from a pair of side frames 2 and end frames 3 which are integrally affixed to the side frames at the both ends of each side frame.

In another words, the conveyor sub-unit 1 comprises a drive roller 5 and a drive roller 6 rotatably pivoted by bolts B at both ends of the side frame 2 along the longitudinal direction thereof, a belt 7 (secondary conveyor portion) suspended in an endless manner across the two rollers 5 and 6, a guide plate 8 fixed by bolts B to the upper portion of the side frames 2, a pair of tension rollers 9 rotatably pivoted also by bolts B to the lower portion of the side frames 2, and a plurality of guide rollers 10, and thereby supporting the belts 7 by these elements so that the belts 7 becomes movable.

As shown in FIG. 2, the drive roller 5 is coupled to a servo motor 11, which is a drive means for the belt 7 is and fixed to the inside of side frame 2, via timing pulleys 12 and 14 and a timing belt 15.

The conveyor sub-unit 1 is by itself, as shown above, provided with a conveyor function.

Further, external moving mechanisms, for example, coupling units 16 to be coupled to chain conveyors and the like are provided in a projecting manner at the outside surfaces of the end frames 3, and ultrasonic distance sensors 17 are provided to face each other at the upper portion of the end frames 3.

The two sensors 17 each is a detection means for detecting at which position there is a detection subject, i.e. a package, on the belt 7 as viewed from both ends 3 and how wide the package is, and the waves each is transmitted and received with the respective wavelengths and phases offset with respect to each other in order to prevent interference. In the figures these are shown to be located at positions projecting from both ends but in use, it is, a matter of course, possible to have these provided without being projecting. Further, it is also possible to embed a number of photocells in each of the frames 3 and thereby to detect position by the photocells while being turned on and off during passage.

The servo motor 11 which is the drive means for the belt 7 is also controllable to go forward and in reverse by a control means 18 provided in the vicinity thereof, as also shown in FIG. 2.

The control means 18 comprises a microcomputer, i.e. a CPU, ROM and RAM, etc. There are provided within the control means a determining means for determining, by using a software along with signals detected by the sensors 17, whether a package is present or not as well as the position and width of the package on the casing 4 when a package is present, and calculating means for receiving instructions from external control means (not shown) for managing the goods distribution as well as information from other conveyor sub-units 1 in the vicinity via inter-sub-unit communication means (not shown) and thereby for calculating from which position a currently positioned package is to be moved to which position along the longitudinal direction of the casing 1 based on the information received and the determination results obtained by the determining means, and the servo motor 11 is driven forward and in reverse based on the calculation results, whereby the package is moved by a required distance from the detected position to the right or left along the main direction of conveyance. The control means 18 transmits to other conveyor sub-units 1 and control instruction devices the information regarding the position information and the like of the package on the belt 7 of the own conveyor sub-unit 1, in which the means is provided, via communication means. The conveyor sub-units 1 can also operate in cooperation with each other and such embodiment is described later. A part or all of the function of this control means 18 may be performed by the control instruction device.

As for the method of providing electricity to the control means 18 and the servo motor 15, there can be employed, for example, a pantograph method where connection terminals for supplying electricity are made to come slidably in contact with the ends thereof so as to supply electricity.

The means for communicating with the control instruction device is provided for receiving instructions regarding package control from a host computer and the like, and a wireless method, such as an infrared communication method, may be employed as the communication method, and it is also possible for the means of communication with other conveyor sub-units (inter-sub-units communication means) to be performed at high-speeds by a serial communication, etc.

Figure 3:
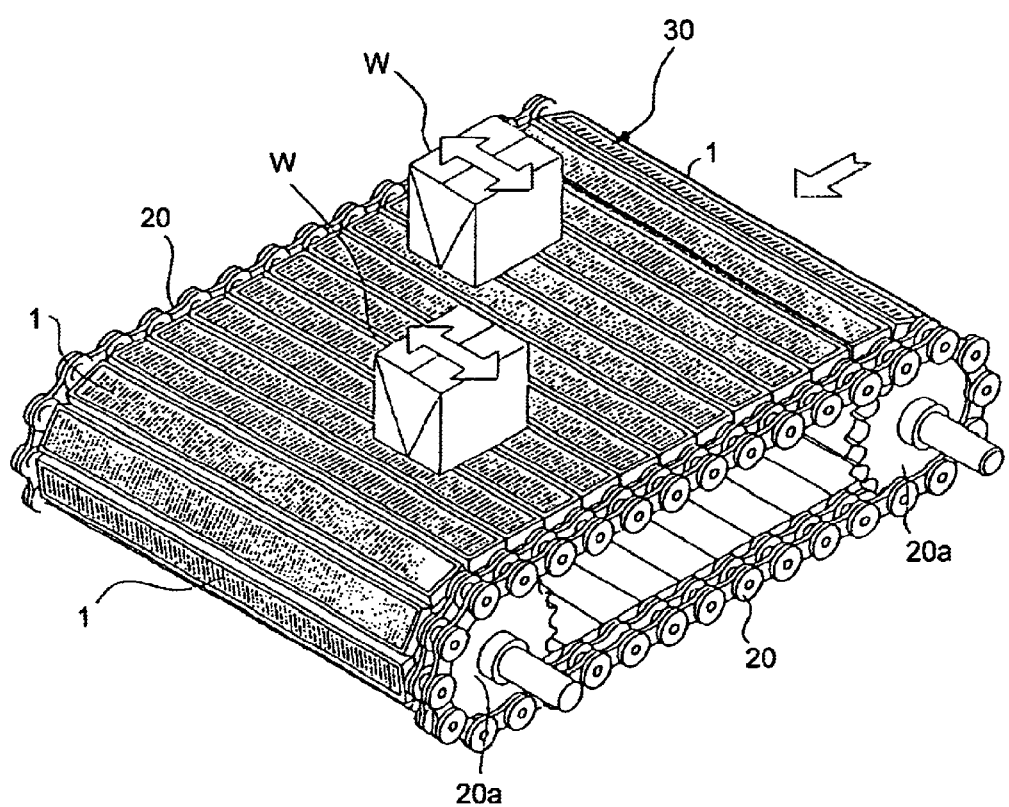
FIG. 3 is a perspective view showing a conveyor which is a concrete example in use of the same conveyor sub-unit.
Figure 4:
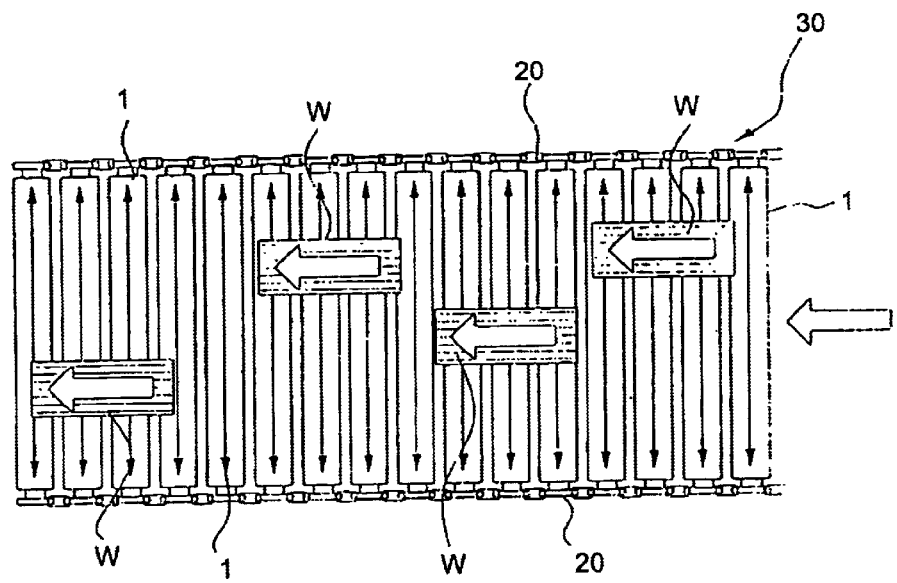
FIG. 4 is a plan view of the same.

Next, an embodiment comprising a conveyor device where conveyor sub-units are coupled is shown. FIG. 3 and FIG. 4 show embodiments of such a conveyor device 30.

In FIG. 3, both ends of a number of conveyor sub-units along the longitudinal direction thereof are lined up side by side while being coupled to the chain 20 and are coupled in an endless manner so as to comprise the main conveyor portion of the conveyor device 30. Both ends of the chain 20 move in an endless manner while being engaged with the sprockets thereby to convey each sub-unit. The shaft of the sprocket is supported by a support table which is not shown here. A servo motor, which is not shown here and is a drive means for main conveyor portion, causes the sprockets to rotate, thereby causing the main conveyor portion thus constituted by the conveyor sub-units to rotate. In this way, the conveyor device 30 causes a package W on the main conveyor portion to move in the main conveying direction.

Each conveyor sub-unit by itself has a function of a belt conveyor, i.e. each conveyor sub-unit is equipped with an endless belt (secondary conveyor portion) and a servo motor 15 (drive means for secondary conveyor portion) which is a means for driving the belt. The drive direction of the belt constituting the secondary conveyor portion is orthogonal to the main conveying direction of the package by the conveyor device 30 and the direction can be rotated in both forward and reverse directions.

In this way, it is made possible that the package W to be moved on the conveyor device 30 can be moved not only in the main conveying direction but also in a direction orthogonal to this direction, i.e. along the longitudinal direction (the conveying direction of the secondary conveyor portion) of each conveyor sub-unit (FIG. 4).

A conveyor system can then be implemented wherein, by connecting with a control instruction device, such as a computer, etc., the conveyor device 30 can receive instructions from the control instruction device thereby move packages to any position in a direction orthogonal to the main conveying direction and change the posture of a package any manner.

In this instance, each conveyor sub-unit may communicate via a means for communicating with the control instruction device, and alternatively, when a conveyor sub-unit is communicatively connected to neighboring conveyor sub-units by inter-sub-units communication means, at least one conveyor sub-unit communicates with the control instruction device and the information can then be communicated to other conveyor sub-units.

Further, the control instruction device can instruct each of the conveyor sub-units of amounts of each movement directly or can instruct a target position to which the package is expected to move. In the latter case, the amount of movement of belts of individual conveyor sub-units is calculated by the conveyor sub-units using each control means of its own.

Next, an example of a conveyor system will be described wherein the conveyor device 30 comprises a plurality of conveyor sub-units, and a plurality of conveyor sub-units operate cooperatively based on instructions from a control instruction device.

Figure 5A:
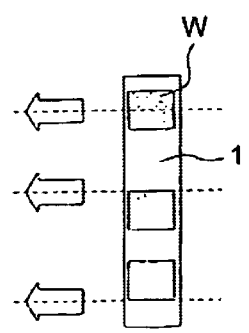
FIG. 5(a) is a plan view showing the mode for moving a package by using a single conveyor sub-unit and FIG. 5(b) is a plan view showing the mode for moving in unison a package when a group of sub-units are used.

As shown in FIG. 5(a), the conveyor sub-units, when taken alone, is such that when a package is directed along the main conveying direction of the conveyor 30 and in case an instruction for a target position for the package to "move to the right", "move to the left", or "position at the center" with respect to the direction of travel is received via a means of communicating with the control instruction device, the position of the package W is measured by the detection means and then the belt (secondary conveyor portion) is moved by the required amount thereby moving the package to the target position. It is also apparent that more specific control is as a matter of course possible giving instructions, such as "move the center of the package W to the right" and "move the left end of package W to the right" etc. rather than left, right and center.

Namely, each conveyor sub-unit can recognize for each package mounted on its own secondary conveyor portion a left end position (P2) and a right end position (P1) as viewed along the direction of travel of the main conveyor portion by using the detection means. Its own conveyor length (L) is provided beforehand as a mechanical parameter. An instruction then comes from the control instruction means with regards to an arrival time (T), a target position (P) and which portion of the package is to be aligned with the target position (left end, center, right or the like). An operating time V for moving to the target position is then calculated. For example, when the left end of a package is to be moved to a target position P in time T, the moving distance is P–P2, and the belt is made to move at V=(P–P2)/T.

Figure 5B:
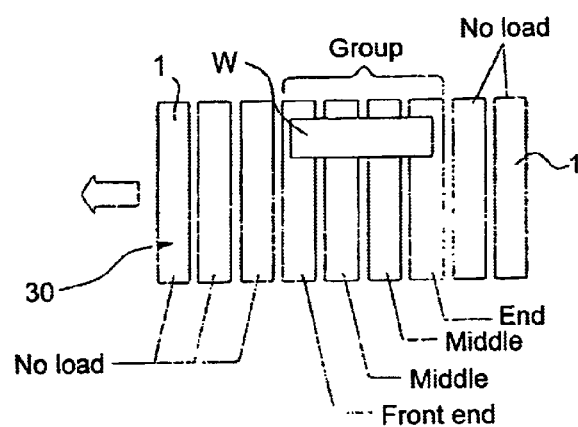

Normally, a package moves on the conveyor device 30 in a state straddling a plurality of conveyor sub-units, as shown in FIG. 5(b), but each respective conveyor sub-unit may also detect the state of package on their own belt by using its detection means and determine whether or not a package is present on their own belt. A conveyor sub-unit with a package mounted thereon communicates with other conveyor sub-units via inter-sub-units communication thereby to determine whether its mannerof involvement with its own package W is the "front end", "center" or "rear end" of the package. A group of conveyor sub-units is then formed by the front end unit, center unit and rear end unit.

The conveyor sub-units constituting the group communicate with each other by using inter-sub-units communication means thereby to move in cooperation to implement the positioning and posturing of the package W instructed by using the means of communicating with the control instruction means which may be a host computer etc. for controlling the entire goods distribution system.

The control instruction device can therefore understand the position and posture of the package W on the main conveyor portion at such point in time through communication with each conveyor sub-unit.

Figure 6A:
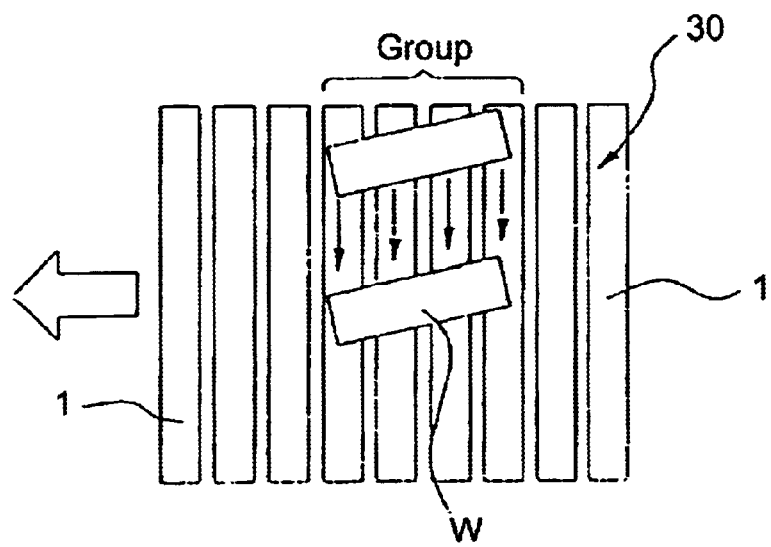
FIG. 6(a) is a plan view showing the mode for moving the same package in parallel and FIG. 6(b) is a plan view showing the mode for moving while posture control is being performed.
Figure 6B:
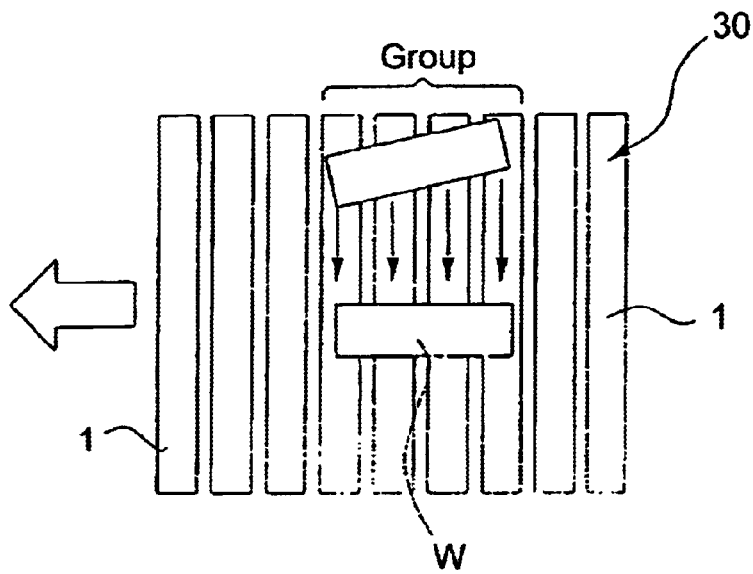

Each conveyor sub-unit is capable of measuring the width and length of packages by using the detection means, and therefore, when a package W is tilted as shown in FIG. 6(*a*), for example, the package can be moved based on the measurement results in a parallel manner whilst maintaining this tilted posture, as shown in FIG. 6(*b*), or can be moved while it is being corrected to become orthogonal to the conveyor sub-unit, by the sub-unit operating in cooperation with other conveyor sub-units belonging to the group.

At this instance, when the package is simply to be moved to the right of the direction of travel of the main conveyor portion by a distance Q, the control device of each conveyor sub-unit forming the group drives its belt to the right by only the distance Q.

When the posture of the package is to be changed, each conveyor sub-unit then regulates the amount of movement of the respective belt by an appropriate amount. When it is desired to move the package to the left as a whole while rotating the package in a clockwise direction when viewed from above the conveyor device 30, as shown in FIG. 6(*b*), for example, the amount of movement to the left is less for the conveyor sub-unit on which the front each portion of the package is mounted.

The method for causing the conveyor sub-units to cooperatively operate for the case shown in FIG. 6(*b*) is now specifically described. At this instance, the posture of the package (angle of inclination with respect to the direction of travel) is taken to be $\theta$. Prior to this cooperative operation, when a target package is mounted on the main conveyor portion of the conveyor device, the control instruction device sends over a fixed time to each conveyor sub-unit a target position to which the package is to be moved. This instruction may not be necessary to be received by each conveyor sub-unit at the same time, and it is suffice for the each conveyor sub-unit to read in the instruction upon recognizing that a package is mounted on its own secondary conveyor portion, as described later. The operation of each conveyor sub-unit is implemented by software implemented each respective control means 18 (microcomputers).

① Each conveyor sub-unit monitors along its own secondary conveyor portion by using the detection device. Instructions from the control instruction device are then read in by the means for communicating with the control instruction device at the time when it recognizes a package being mounted thereon.

Figure 12:
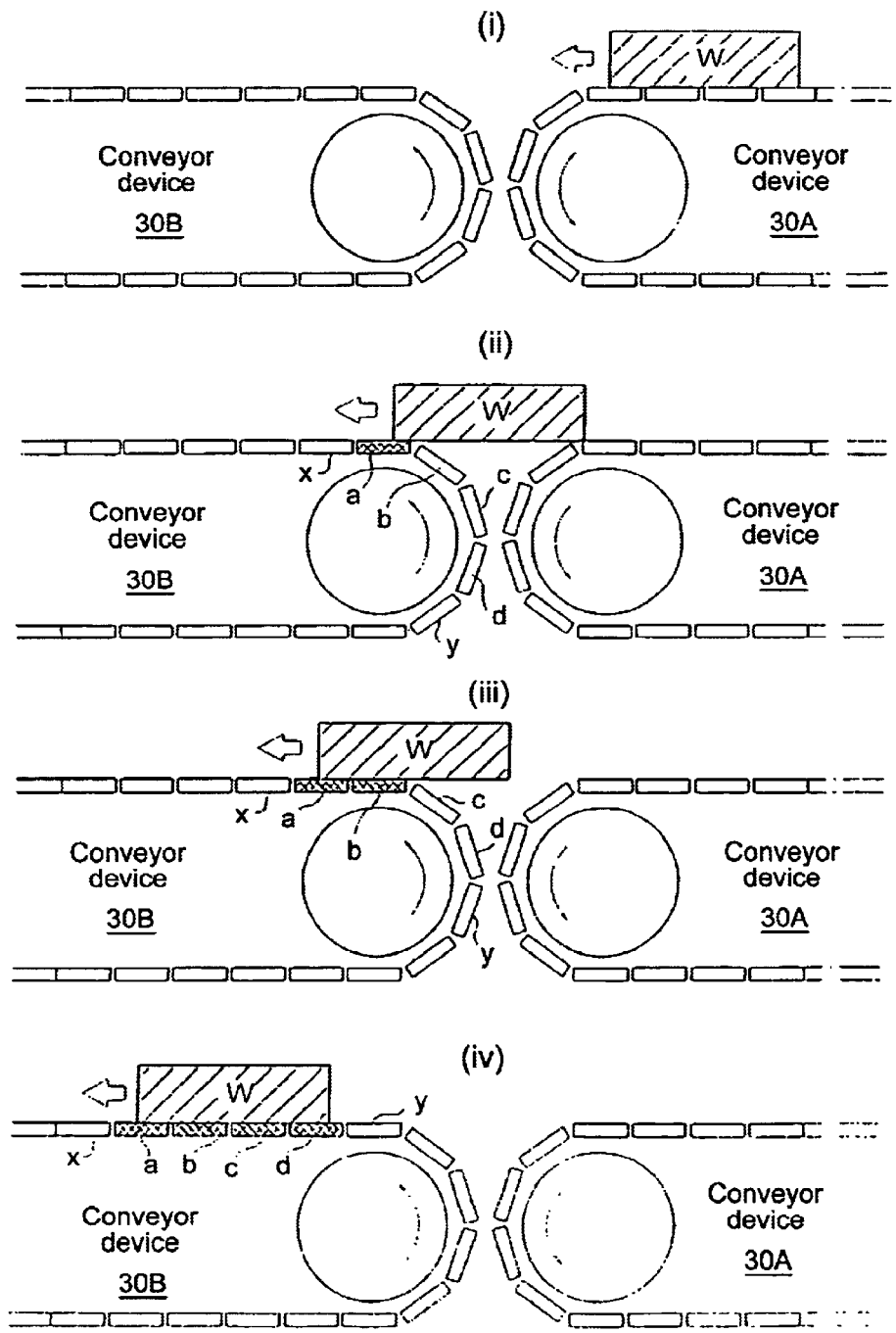
FIG. 12 is a front view showing the process of cooperative operation of the conveyor sub-units.

An example of a method of reading in instructions from the control instruction device is now shown with reference to FIG. 12. It is presumed that a package comes down from an upstream conveyor device 30A to a conveyor device 30B, as shown in FIG. 12(*i*). Thereafter, attention is focused on conveyor device 30B. As the package comes down toward the main conveyor portion of the conveyor device 30B, the package becomes sequentially mounted on the secondary conveyor portion of sub-conveyor units, a, b, c and d, and thus, each of the conveyor sub-units then recognizes the presence and position of the package on its own secondary conveyor portion and reads in the instruction for the target position of the package from the control instruction device (FIG. 12 (*ii*) to (*vi*)).

Figure 13:
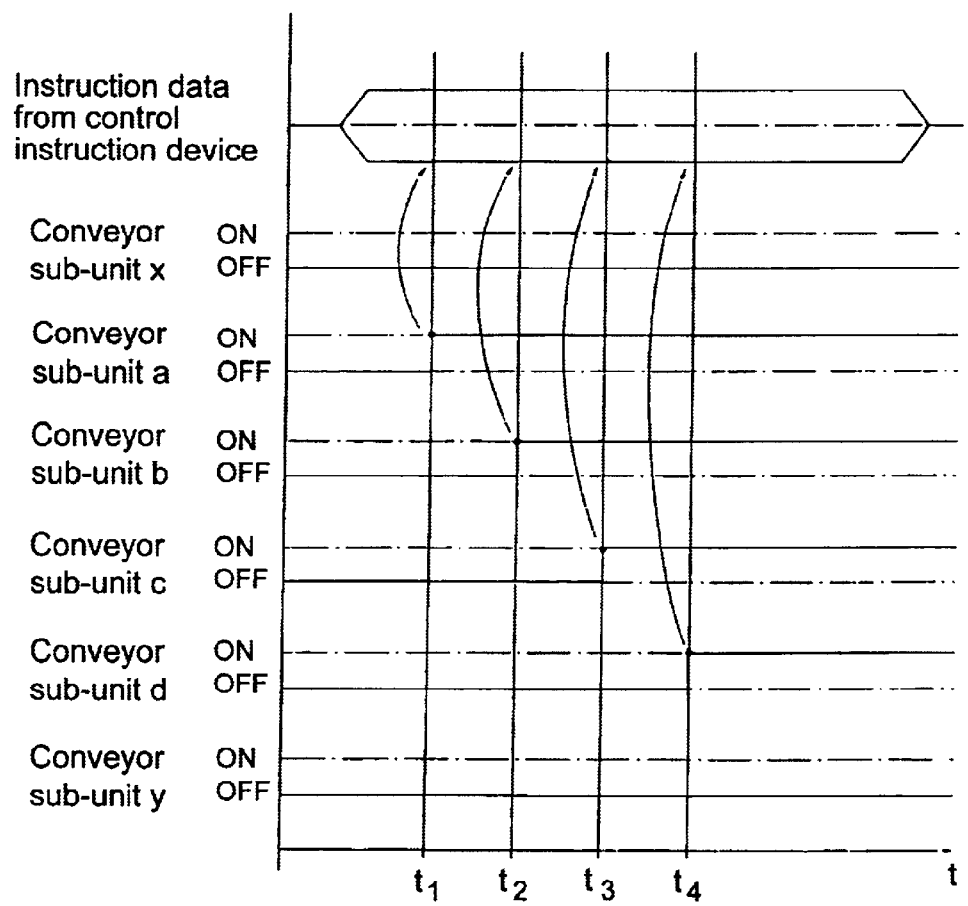
FIG. 13 shows the timing at which the conveyor sub-units take in instructions from the control device while being in a cooperative operation.

An example of the timing at which each conveyor sub-unit reads instructions from the control instruction device during this process is shown in FIG. 13. At time t1 (corresponding to FIG. 12 (*ii*)) in FIG. 13, the conveyor sub-unit, a, recognizes that a package is present on its own secondary conveyor portion (in FIG. 13, a is changed from OFF to ON), and at this time, an instruction from the control instruction device is acquired via the communication means. Similarly, for b at time t2 (FIG. 12(*iii*)), c at time t3, and d at time t4 (FIG. 12(*iv*)), each sub-unit recognizes that a package is mounted on its own secondary conveyor portion, and then instructions are taken in from the control instruction device.

② The conveyor sub-units (a, b, c, d) each that has recognized that a package is mounted on its own secondary conveyor portion queries the conveyor sub-units in the front and in the rear thereof as to the presence of a package by using the inter-sub-unit communication.

In case of the example as shown in FIG. 12, in FIG. 12(*iv*), the conveyor sub-unit queries conveyor sub-units x (in the front) and b (in the rear) each as to the presence or absence of a package. Similarly, b queries a and c, c queries b and d, and d queries c and y.

③ Each of the respective conveyor sub-units:
recognizes itself to be the leading unit if no package is present on the conveyor sub-unit in the front thereof;
recognizes itself to be the tail end unit if no package is present on the conveyor sub-unit in the rear thereof;
recognizes itself to be a single unit if no package is present on either of the conveyor sub-units in the front and in the rear thereof;
recognizes itself to be a central conveyor if a package is present on both of the conveyors in the front and in the rear thereof; and recognizes itself to be an nth sub-unit from the leading unit (when the leading unit is set to be 1) by using inter-sub-units communication.

In the example in FIG. 12, the conveyor sub-unit, a, recognizes itself to be leading, b recognizes itself to be second, c recognizes itself to be third and d recognizes itself to be fourth (last).

④ Each conveyor unit calculates the amount of movement, PO, reqired of itself to implement a posture ($\theta$), an instruction for position control (left end, center, right end) and a target package position (P), which is received from the control instruction device.

In the case in FIG. 6(*b*), when the amount of movement is P when calculated based on the difference between the left end position of the package of the leading sub-unit and the target position P while the left end of the package is set as a reference, the amount of movement for each conveyor sub-unit can be obtained from $PO = p + (n \times D) \tan \theta$. In this instance, D is the interval between conveyor sub-units and is provided beforehand. The calculation may be communicated to other conveyor sub-units by using the inter-sub-unit communication means after it is carried out by a specific conveyor sub-unit or by the control instruction device.

⑤ When notification is given of the commencement of operation by the leading unit, each conveyor sub-unit starts to operate its own secondary conveyor portion by the required amount.

Figure 7A:
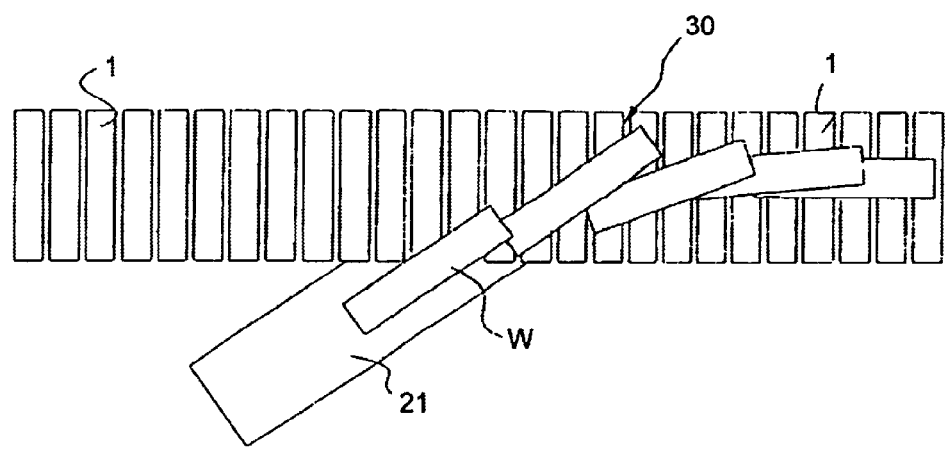
FIG. 7 shows the mode for the same at the time of branching, with FIG. 7(a) being a plan view showing the branching mode for an elongated package, and FIG. 7(b) showing a plan view for the branching mode for a short package.
Figure 7B:
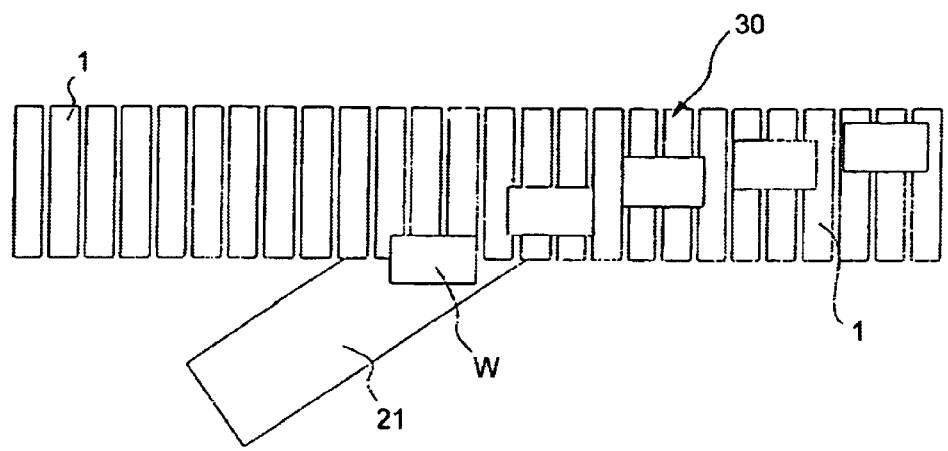

FIG. 7 shows a possible situation where the conveyor device 30 reaches the position of a sorting unit 21 branching at an angle, showing an example of a practical implementation of the cooperative operation described above. FIG. 7(*a*) shows a case where there is branched off a package W which is long with respect to the width of the sorting unit 21, and in this case, as the corresponding package approaches the sorting unit 21, the angle of the package is also made to approach the angle of the sorting unit 21 until finally being corrected to a condition where the package is in parallel to the sorting unit 21, and whereby the package is then handed over to the sorting unit 21. Further, FIG. 7(*b*) shows the situation where a package W, short in dimension, arrives, and in this case, the package can be moved to the side of the sorting unit 21 while maintaining its posture.

Figure 8:
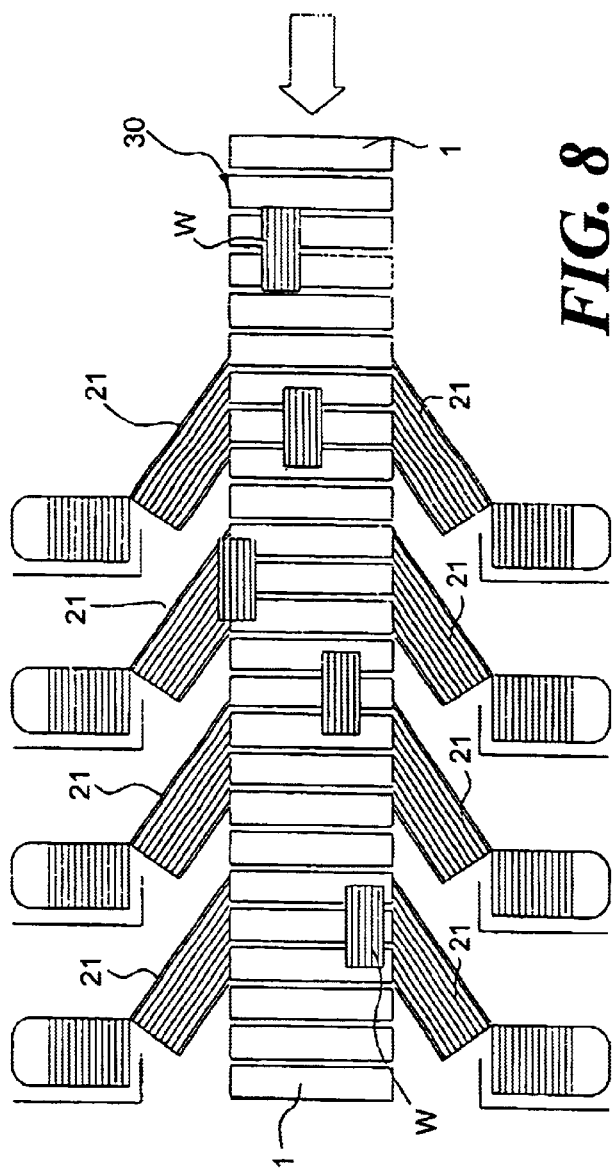
FIG. 8 is a plan view showing a layout for the case where the same conveyor sub-units are applied to the case of branching to both sides.
Figure 10:
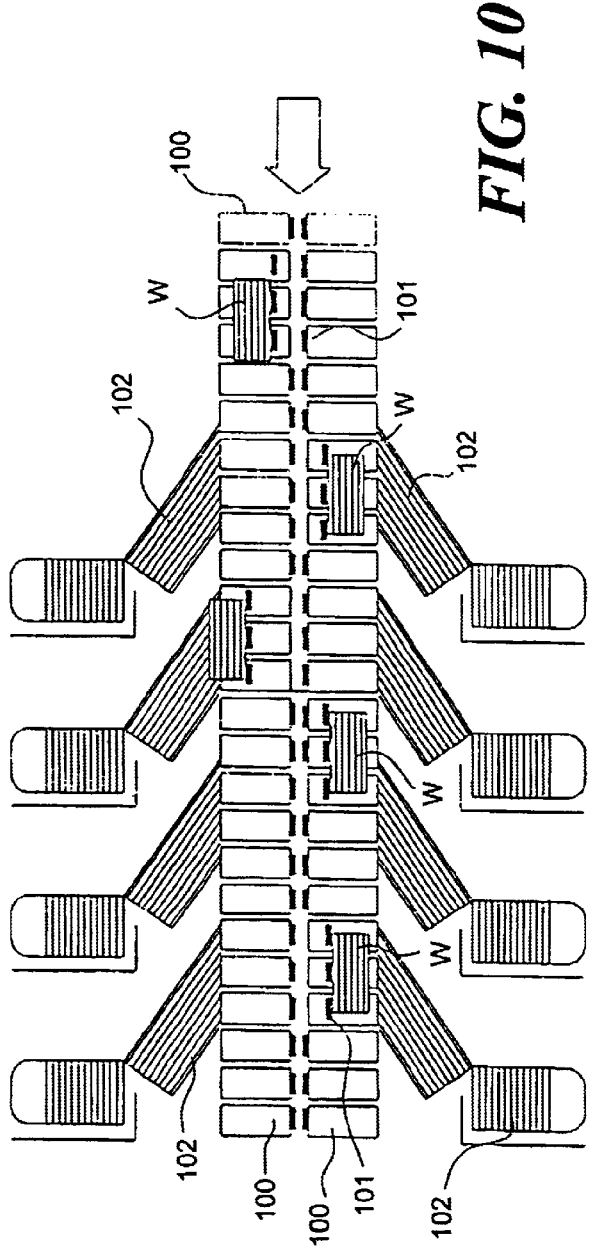
FIG. 10 is a plan view showing a layout for a case where branching is carried out to both sides by a conventional branching device.
Figure 11:
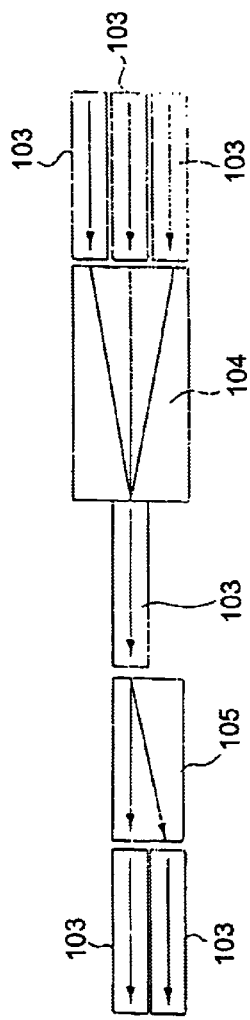
FIG. 11 is a plan view showing a layout for a case of branching and merging by the conventional method.

FIG. 8 shows a branching process for the case where a plurality of sorting units 21 is located on both the left and the right of the conveyor device 30, and in this case, the branch process is carried out to both the left and the right thereby making it possible to have mechanical simplification compared with the conventional two-line system (refer to FIG. 10) because one line is sufficient.

Figure 9:
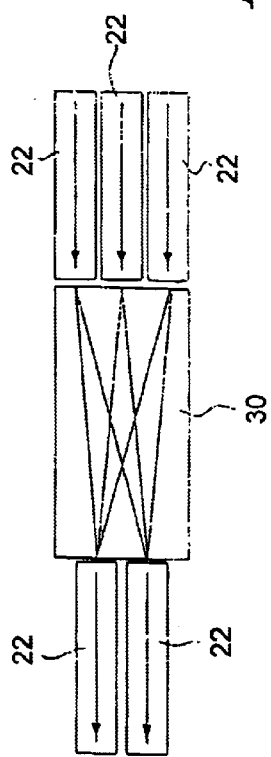
FIG. 9 is a plan view showing a layout for the case where the same conveyor sub-units are applied to the case of multiple merging and multiple branching.

FIG. 9 shows a case where the aforementioned conveyor device 30 is applied to multiple merging and multiple branching, and a package W conveyed over a three-line conveyor 22 is branched to the side of a two-line conveyor 22 via the conveyor device 30, whereby the mechanism can be simplified and the lines made shorter compared to a layout where there are provided merging assemblies and branching assemblies for achieving the same operation by the conventional method. Adjustments and modifications may be also made possible by using software without changing any mechanical portions.

In all of the above embodiments, the detection means and control means are provided on each conveyor sub-unit, but it is by no means necessary for these means to be provided on each conveyor sub-unit. For example, it is not necessary for the detection means to be provided on the conveyor sub-unit in the case of detecting the position of a package on an secondary conveyor portion of a conveyor sub-unit by using an external sensor. Further, it is not necessary for the control means to be provided on the conveyor sub-unit when calculations as to the cooperative operations are performed by a computer such as a control instruction device. In such cases, the information such as package position information or calculation results etc. is sent to each conveyor sub-unit by using communication means. In this manner, it is possible to implement the same operation by using substantially the same method as shown for the aforementioned embodiment.

It is likewise not necessary to use the same type of unit for the conveyor sub-unit when a conveyor device of the present invention is constructed by using conveyor sub-units of the present invention. Namely, it is possible to construct a conveyor device where only some of the conveyor sub-units have control means but other conveyor sub-units do not have any control means. In this case, those conveyor sub-units which do not have any control means can acquire calculation results obtained by communication from those conveyor units having control means or from a control instruction device. This enables a plurality of conveyor sub-units to cooperatively operate.

In a further embodiment of a conveyor sub-unit, conveyor sub-units may be lined up in parallel to form a plane so that control of the posture of a package and moving of a package in the conveying direction of a conveyor portion of the conveyor sub-unit are made possible. In the case of such a device, the package can be made to move only in the conveying direction of the conveyor portion of the conveyor sub-unit but this enables the posture and position of a mounted package to be changed.

For example, in case a package is grasped by a robot and the like, when the posture and position of a target object is not clearly known, it is necessary for the robot to be equipped with a sensor corresponding to a visionary sense so that the robot can recognize the object, and if the posture of the body is aligned by being mounted on the conveyor of the present invention, it is not necessary for the robot itself to be equipped with the sensor and the system construction can therefore be simplified.

Furthermore, the conveyor sub-units of the present invention may be used in such an application as where a pair of the conveyor units are provided at an end of a conveyor mechanism with each standing perpendicularly to face the other whereby the package approaching the end can be sandwiched manner by using a mechanism for grasping in a held in a sandwiched manner and the package can then be pushed up in a perpendicular direction.

INDUSTRIAL APPLICABILITY

As can be clear from the above description, packages can be moved to any position in a direction orthogonal to the main package conveying direction and an arbitrary posture can be maintained or changed for the packages in a goods distribution system, etc. according to the present invention. Namely, packages on a conveyor can be moved in any way and thereby effectuating the merging, branching off and other movement at a high speed. Further, the posture of a package can be controlled and thereby aligning its position and posture in order to utilize in other machinery, etc.

Moreover, the number of types of equipment can be reduced for goods distribution equipment used in the construction of a goods distribution system, thereby making it unnecessary to increase the size of an assembly itself to achieve high-speeds.

Still further, modifications to the system assembly can be made in a flexible and straightforward manner thereby reducing the cost.

What is claimed is:

1. A conveyor device comprising a main conveyor portion formed by linking together a plurality of conveyor sub-units, and a driving means for driving the main conveyor portion, wherein each of the conveyor sub-units comprises a secondary conveyor portion, a drive means for secondary conveyor portion for driving the secondary conveyor portion forward and in reverse, and means for communicating with a control instruction device, wherein a conveying direction of each of the secondary conveyor portion is orthogonal to a conveying direction of the main conveyor portion, and wherein some or all of the conveyor sub-units each comprises a detection means for detecting a position of a package on its own secondary conveyor portion.

2. A conveyor device comprising a main conveyor portion formed by linking together a plurality of conveyor sub-units, and a drive means for driving the main conveyor portion, wherein each of the conveyor sub-units comprises a secondary conveyor portion, a drive means for secondary conveyor portion for driving the secondary conveyor portion forward and in reverse, and a means for performing inter-units communication with other conveyor sub-units, wherein at least one of the conveyor sub-units comprises a means for communicating with a control instruction device, wherein a conveying direction of each of the secondary conveyor portion is in a direction orthogonal to a conveying direction of the main conveyor portion, and wherein some or all of the conveyor sub-units each comprises a detection means for detecting a position of a package on its own secondary conveyor portion.

3. The conveyor device of claim 1, wherein some or all of the conveyor sub-units each comprises a control means for the drive means for driving a secondary conveyor portion.

4. The conveyor device of claim 1, wherein the conveyor sub-units are linked together in an endless manner.

5. The conveyor system comprising a control instruction device and the conveyor device of claim 1, wherein the conveyor sub-units belonging to the portion where the package is mounted operate cooperatively when a package is mounted so as to straddle across a plurality of the conveyor sub-units constituting the main conveyor portion.

6. A conveyor system comprising a control instruction device and a conveyor device, wherein the conveyor device comprises a main conveyor portion formed by a plurality of conveyor sub-units being coupled and a drive means for the main conveyor portion, wherein the each conveyor sub-unit comprises a secondary conveyor portion, a drive means for driving the secondary conveyor portion forward and in reverse, a means for inter-units communication with other conveyor sub-units, a detection means for detecting a position of a package on its own secondary conveyor portion, and a control means for the drive means for the secondary conveyor portion, wherein at least one of the conveyor sub-units comprises a means for communicating with a control instruction device, wherein a conveying direction of the each secondary conveyor portion is in a direction orthogonal to a conveying direction of the main conveyor portion, and wherein when a package is mounted on the main conveyor portion, the conveyor sub-units belonging to a portion where the package is mounted cooperatively operate where each:

(1) recognizes the position of the package on its own secondary conveyor portion by using the detection means, (2) calculates a required amount of movement for its own secondary conveyor portion from a relationship between a package position to be materialized and is given by an instruction from the control instruction device and a current package position, and (3) moves its own secondary conveyor portion only by the required amount by using the drive means for the secondary conveyor portion.

7. The conveyor device of claim 2, wherein some or all of the conveyor sub-units each comprises a control means for the drive means for driving a secondary conveyor portion.

8. The conveyor device of claim 2, wherein the conveyor sub-units are linked together in an endless manner.

9. The conveyor device of claim 3, wherein the conveyor sub-units are linked together in an endless manner.

10. The conveyor device of claim 7, wherein the conveyor sub-units are linked together in an endless manner.

* * * * *